US012142758B2

(12) United States Patent
Hirose et al.

(10) Patent No.: US 12,142,758 B2
(45) Date of Patent: Nov. 12, 2024

(54) NEGATIVE ELECTRODE ACTIVE MATERIAL AND METHOD FOR PRODUCING THE SAME

(71) Applicant: SHIN-ETSU CHEMICAL CO., LTD., Tokyo (JP)

(72) Inventors: Takakazu Hirose, Annaka (JP); Reiko Sakai, Takasaki (JP); Yusuke Osawa, Annaka (JP); Kohta Takahashi, Takasaki (JP); Takumi Matsuno, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 509 days.

(21) Appl. No.: 17/296,444

(22) PCT Filed: Nov. 5, 2019

(86) PCT No.: PCT/JP2019/043250
§ 371 (c)(1),
(2) Date: May 24, 2021

(87) PCT Pub. No.: WO2020/110625
PCT Pub. Date: Jun. 4, 2020

(65) Prior Publication Data
US 2022/0013770 A1 Jan. 13, 2022

(30) Foreign Application Priority Data
Nov. 28, 2018 (JP) .................................. 2018-222880

(51) Int. Cl.
*H01M 4/485* (2010.01)
*H01M 4/02* (2006.01)

(52) U.S. Cl.
CPC ...... *H01M 4/485* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 5,395,711 | A | 3/1995 | Tahara et al. |
| 7,459,236 | B2 | 12/2008 | Konishiike et al. |
| 8,377,592 | B2 | 2/2013 | Jeong et al. |
| 2006/0099507 | A1 | 5/2006 | Kogetsu et al. |
| 2008/0176137 | A1 | 7/2008 | Endo et al. |
| 2009/0202911 | A1 | 8/2009 | Fukuoka et al. |
| 2016/0233484 | A1 | 8/2016 | Hirose et al. |
| 2016/0254525 | A1 | 9/2016 | Hirose et al. |
| 2018/0323424 | A1 | 11/2018 | Hirose et al. |
| 2019/0058189 | A1 | 2/2019 | Matsuno et al. |
| 2019/0123344 | A1 | 4/2019 | Hirose et al. |
| 2019/0131618 | A1 | 5/2019 | Hirose et al. |
| 2019/0148728 | A1 | 5/2019 | Kamo et al. |
| 2019/0157663 | A1* | 5/2019 | Hirose .................... H01M 4/58 |
| 2020/0028152 | A1 | 1/2020 | Hirose et al. |
| 2022/0352503 | A1 | 11/2022 | Hirose et al. |

FOREIGN PATENT DOCUMENTS

| | | |
|---|---|---|
| CN | 108292747 A | 7/2018 |
| CN | 108352522 A | 7/2018 |
| EP | 3 633 772 A1 | 4/2020 |
| JP | H06-325765 A | 11/1994 |
| JP | 2001-185127 A | 7/2001 |
| JP | 2002-042806 A | 2/2002 |
| JP | 2006-004813 A | 1/2006 |
| JP | 2006-114454 A | 4/2006 |
| JP | 2006-164954 A | 6/2006 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2015-153520 A | 8/2015 |

(Continued)

OTHER PUBLICATIONS

Zhang, S., Tie, S., Zhang, F.-Cristobalite formation from the thermal treatment of amorphous silica fume recovered from the metallurgical silicon industry, Micro & Nano Letters, accepted on Jun. 21, 2018 (Year: 2018).*
Apr. 11, 2023 Office Action issued in Taiwanese Patent Application No. 108140762.
Dec. 7, 2021 Office Action issued in Japanese Patent Application No. 2018-222880.
Battery Association of Japan, Newsletter, "Denchi (battery)," May 1, 2010, p. 10.
Hohl et al., "An interface clusters mixture model for the structure of amorphous silicon monoxide (SiO)," Journal of Non-Crystalline Solids, 2003, vol. 320, pp. 255-280.
Kapaklis, V., "Structural characterization of silicon nanocrystals from amorphous silicon oxide materials," Journal of Non-Crystalline Solids, 2008, vol. 354, pp. 612-617.

(Continued)

*Primary Examiner* — Anca Eoff
(74) *Attorney, Agent, or Firm* — Oliff PLC (57) ABSTRACT

A negative electrode active material containing negative electrode active material particles. The negative electrode active material particles include silicon compound particles each containing an oxygen-containing silicon compound. The silicon compound particle contains at least one of $Li_2SiO_3$ and $Li_2Si_2O_5$. The silicon compound particle has, in a Si K-edge spectrum obtained from a XANES spectrum: a peak P derived from the Li silicate and located near 1847 eV; and a peak Q gentler than the peak P and located near 1851 to 1852 eV. This provides a negative electrode active material that is capable of stabilizing a slurry when the negative electrode active material is used for a secondary battery, and capable of increasing the battery capacity by improving the initial efficiency.

1 Claim, 4 Drawing Sheets

(56) References Cited

FOREIGN PATENT DOCUMENTS

| | | | |
|---|---|---|---|
| JP | 2015-156355 A | | 8/2015 |
| JP | 2019-091615 A | | 6/2019 |
| TW | 201731145 A | | 9/2017 |
| WO | 2015/063979 A1 | | 5/2015 |
| WO | 2017/183286 A1 | | 10/2017 |
| WO | 2017/208624 A1 | | 12/2017 |
| WO | 2017/208627 A1 | | 12/2017 |
| WO | WO 2017/208625 | * | 12/2017 |
| WO | 2018/221268 A1 | | 12/2018 |

OTHER PUBLICATIONS

Miyachi et al., "Electrochemical Properties and Chemical Structures of Metal-Doped SiO Anodes for Li-Ion Rechargeable Batteries," Journal of The Electrochemical Society, 2007, vol. 154, No. 4, pp. A376-A380.

Yamada et al., "Reaction Mechanism of 'SiO'-Carbon Composite-Negative Electrode for High-Capacity Lithium-Ion Batteries," Journal of The Electrochemical Society, 2012, vol. 159, No. 10, pp. A1630-A1635.

Kim et al., "Solid-State NMR and Electrochemical Dilatometry Study on Li+ Uptake/Extraction Mechanism in SiO Electrode," Journal of The Electrochemical Society, 2007, vol. 154, No. 12, pp. A1112-A1117.

Kim et al., "Controlled Prelithiation of Silicon Monoxide for High Performance Lithium-Ion Rechargeable Full Cells," Nano Letters, 2016, vol. 16, pp. 282-286.

Li et al., "X-ray absorption spectroscopy of silicon dioxide (SiO2) polymorphs: The structural characterization of opal," American Mineralogist, 1994, vol. 79, pp. 622-632.

Jan. 21, 2020 International Search Report issued in International Patent Application No. PCT/JP2019/043250.

May 25, 2021 International Preliminary Report on Patentability issued in International Patent Application No. PCT/JP2019/043250.

Nov. 22, 2022 Search Report issued in European Patent Application No. 19890017.7.

Dec. 5, 2023 Office Action and Search Report issued in Chinese Patent Application No. 201980077564.6.

Jun. 20, 2024 Decision of Refusal in Chinese Application No. 201980077564.6.

* cited by examiner

NEGATIVE ELECTRODE ACTIVE MATERIAL AND METHOD FOR PRODUCING THE SAME

TECHNICAL FIELD

The present invention relates to a negative electrode active material and a method for producing the same.

BACKGROUND ART

In recent years, small electronic devices, represented by mobile terminals, have been widely used and urgently required to reduce the size and weight and to increase the life. Such market requirements have advanced the development of particularly small and lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity, and have higher energy density than that of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon-based active material, is required to further improve the battery capacity for recent market requirement. Use of silicon as a negative electrode active material is considered to improve the battery capacity, for silicon has a theoretical capacity (4199 mAh/g) ten times or more larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes ranges from an application type, which is standard for carbon materials, to an integrated type in which the materials are directly accumulated on a current collector.

Use of silicon as a main material of a negative electrode active material, however, expands or shrinks the negative electrode active material when charging or discharging, thereby making the negative electrode active material easy to break particularly near its surface layer. In addition, this negative electrode active material produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle characteristics easy to reduce.

Various materials of a negative electrode material for a lithium-ion secondary battery mainly using a silicon material and various electrode configurations have been considered to improve the initial efficiency and the cycle characteristics of the battery.

Specifically, a vapor deposition method is used to accumulate silicon and amorphous silicon dioxide simultaneously so that better cycle characteristics and greater safety are achieved (see Patent Document 1, for example). Moreover, a carbon material (electronic conduction material) is disposed on the surface of silicon oxide particles so that a higher battery capacity and greater safety are achieved (see Patent Document 2, for example). Moreover, an active material including silicon and oxygen is produced to form an active material layer having a higher ratio of oxygen near a current collector so that improved cycle characteristics and higher input-output characteristics are achieved (see Patent Document 3, for example). Moreover, silicon active material is formed so as to contain oxygen with an average oxygen content of 40 at % or less and with a higher oxygen content near a current collector so that improved cycle characteristics are achieved (see Patent Document 4, for example).

Moreover, a nano-complex including Si-phase, $SiO_2$, and $M_yO$ metal oxide is used to improve the first time charge-discharge efficiency (see Patent Document 5, for example). To improve the cycle characteristics, $SiO_x$ ($0.8 \leq x \leq 1.5$, the range of particle size=1 μm to 50 μm) and a carbon material are mixed and calcined at a high temperature (see Patent Document 6, for example). A negative electrode active material is controlled by adjusting a mole ratio of oxygen to silicon in the active material in the range from 0.1 to 1.2 so as to hold a difference between the maximum and the minimum of the oxygen-to-silicon mole ratio near the interface between the active material and a current collector at 0.4 or less, so that improved cycle characteristics are achieved (see Patent Document 7, for example). Moreover, a metal oxide containing lithium is used to improve the battery load characteristics (see Patent Document 8, for example). To improve the cycle characteristics, a hydrophobic layer such as a silane compound layer is formed on the surface of a silicon material (see Patent Document 9, for example). Moreover, a silicon oxide is used and a surface thereof is coated with graphite coating to give electric conductivity so that improved cycle characteristics are achieved (see Patent Document 10, for example). In Patent Document 10, the graphite coating exhibits a RAMAN spectrum that has broad peaks at shift values of 1330 $cm^{-1}$ and 1580 $cm^{-1}$, and their intensity ratio $I_{1330}/I_{1580}$ satisfies $1.5 < I_{1330}/I_{1580} < 3$. Similarly, particles having a silicon microcrystal phase dispersed in a silicon dioxide are used to achieve a higher battery capacity and improved cycle characteristics (see Patent Document 11, for example). Moreover, a silicon oxide controlled to have a silicon-to-oxygen atomicity ratio of 1:y ($0<y<2$) is used to improve overcharge and overdischarge characteristics (see Patent Document 12, for example).

Further, as lithium-ion secondary battery using silicon oxide, Hitachi Maxell, Ltd. has started shipping prismatic secondary batteries for smart phone which employ nano-silicon composite, since June in 2010 (see Non Patent Document 1, for example). Silicon oxide proposed by Hohl is in the form of a composite material with $Si^{0+}$ to $Si^{4+}$ having various oxidation states (Non Patent Document 2). Moreover, Kapaklis has proposed a disproportionation structure in which silicon oxide is converted into Si and $SiO_2$ by receiving heat load (Non Patent Document 3).

Miyachi et al. have focused on Si and $SiO_2$, which contribute to charge and discharge, in silicon oxide having disproportionation structure (Non Patent Document 4). Yamada et al. have proposed a reaction equation between silicon oxide and Li as follows (Non Patent Document 5).

$$2SiO(Si+SiO_2)+6.85Li^{+}+6.85e^{-} \rightarrow 1.4Li_{3.75}Si + 0.4Li_4SiO_4 + 0.2SiO_2$$

In the reaction equation, Si and $SiO_2$ constituting silicon oxide react with Li, so that the starting material is converted and separated into Li silicide, Li silicate, and partially-unreacted $SiO_2$.

The resulting Li silicate is irreversible; once formed, it is a stable substance and does not release Li. The capacity per mass calculated from this reaction equation has a value close to experimental values, and the reaction equation is recognized as the reaction mechanism of silicon oxide. In Kim et al., irreversible component, Li silicate, in charging and discharging of silicon oxide has been identified in the form of $Li_4SiO_4$ by employed $^7Li$-MAS-NMR and $^{29}Si$-MAS-NMR (Non Patent Document 6). The most disadvantageous aspect of silicon oxide is the irreversible capacity, and the improvement has been demanded. Hence, Kim et al. have greatly improved the initial battery efficiency by employed a prelithiation method in which Li silicate is formed in advance, and prepared a negative electrode applicable to actual uses (Non Patent Document 7).

Furthermore, instead of the method of doping an electrode with Li, there has been proposed a method of treating a powder to improve the irreversible capacity (Patent Document 13).

CITATION LIST

Patent Literature

Patent Document 1: JP 2001-185127 A
Patent Document 2: JP 2002-042806 A
Patent Document 3: JP 2006-164954 A
Patent Document 4: JP 2006-114454 A
Patent Document 5: JP 2009-070825 A
Patent Document 6: JP 2008-282819 A
Patent Document 7: JP 2008-251369 A
Patent Document 8: JP 2008-177346 A
Patent Document 9: JP 2007-234255 A
Patent Document 10: JP 2009-212074 A
Patent Document 11: JP 2009-205950 A
Patent Document 12: JP H06-325765 A
Patent Document 13: JP 2015-156355 A Non Patent Literature Non Patent Document 1: Battery Association of Japan, Newsletter "Denchi (battery)", May 1, 2010, p. 10
Non Patent Document 2: A. Hohl, T. Wieder, P. A. van Aken, T. E. Weirich, G. Denninger, M. Vidal, S. Oswald, C. Deneke, J. Mayer, and H. Fuess: J. Non-Cryst. Solids, 320, (2003), 255.
Non Patent Document 3: V. Kapaklis, J. Non-Crystalline Solids, 354 (2008) 612
Non Patent Document 4: Mariko Miyachi, Hironori Yamamoto, and Hidemasa Kawai, J. Electrochem. Soc. 2007 volume 154, issue 4, A376-A380
Non Patent Document 5: M. Yamada, A. Inaba, A. Ueda, K. Matsumoto, T. Iwasaki, T. Ohzuku, J. Electrochem. Soc., 159, A1630 (2012)
Non Patent Document 6: Taeahn Kim, Sangjin Park, and Seung M. Oh, J. Electrochem. Soc. volume 154, (2007), A1112-A1117.
Non Patent Document 7: Hye Jin Kim, Sunghun Choi, Seung Jong Lee, Myung Won Seo, Jae Goo Lee, Erhan Deniz, Yong Ju Lee, Eun Kyung Kim, and Jang Wook Choi. Nano Lett. 2016, 16, 282-288.

SUMMARY OF INVENTION

Technical Problem

As described above, small electronic devices, represented by mobile devices, have been advancing recently toward high performance and multifunction, and a lithium-ion secondary battery that is main electric source thereof is required to increase the battery capacity. As a technique to solve this problem, it is desired to develop a lithium-ion secondary battery containing a negative electrode using a silicon material as a main material. Moreover, such a lithium-ion secondary battery using a silicon material is desired to have initial charge-discharge characteristics and cycle characteristics almost equivalent to those of a lithium-ion secondary battery using a carbon-based active material. Accordingly, the cycle characteristics and initial charge-discharge characteristics have been improved by using a negative electrode active material that is silicon oxide modified by insertion and partial release of Li. However, due to the modification with Li, the modified silicon oxide has relatively low water resistance. This causes insufficient stability of slurry which is prepared by incorporating the modified silicon oxide when a negative electrode is produced. Consequently, a gas may be generated as the slurry changes with time. Hence, there has not been proposed a negative electrode active material which imparts initial charge-discharge characteristics equivalent to those by carbon-based active materials and exhibits slurry stability equivalent to those by carbon-based active materials when the negative electrode active material is used for lithium-ion secondary battery.

The present invention has been made in view of the above problems. An object of the present invention is to provide a negative electrode active material that is capable of stabilizing a slurry when the negative electrode active material is used for a secondary battery, and capable of increasing the battery capacity by improving the initial efficiency. Another object is to provide method for producing a negative electrode active material that is capable of stabilizing a slurry when the negative electrode active material is used for a secondary battery, and capable of increasing the battery capacity.

Solution to Problem

To achieve the object, the present invention provides a negative electrode active material containing negative electrode active material particles, wherein the negative electrode active material particles comprise silicon compound particles each containing a silicon compound that contains oxygen, the silicon compound particle contains at least one of $Li_2SiO_3$ and $Li_2Si_2O_5$, and the silicon compound particle has, in a Si K-edge spectrum obtained from a XANES spectrum:

a peak P which is derived from the Li silicate and located near 1847 eV; and a peak Q which is gentler than the peak P and located near 1851 to 1852 eV.

Since the inventive negative electrode active material (hereinafter also referred to as silicon-based negative electrode active material) contains negative electrode active material particles including silicon compound particles (hereinafter also referred to as silicon-based negative electrode active material particles), the battery capacity can be improved. Moreover, incorporating at least one of $Li_2SiO_3$ and $Li_2Si_2O_5$ as Li compound in the silicon compound particles makes it possible to reduce irreversible capacity generated in charging. Further, the inventive negative electrode active material has a peak near 1851 to 1852 eV measured in XANES (X-ray Absorption Near Edge Structure). The inventive negative electrode active material having such a peak makes an aqueous slurry prepared therefrom have favorable stability, and suppresses or delays gas generation. The Li compound described here refers to $Li_2SiO_3$ and $Li_2Si_2O_5$, and has such a structure that the reactivity with water is greatly suppressed in comparison with $Li_4SiO_4$ to be obtained generally by charge and discharge or short circuit, in other words, electrochemically.

In this case, the peak Q is preferably a peak derived from a cristobalite-type structure of $SiO_2$.

In this manner, the peak Q near 1851 to 1852 eV is presumably derived from a structure resembling cristobalite structure (see American Mineralogist, Volume 79, pages 622-632, 1994). Having such a structure is preferable because an aqueous slurry prepared using the inventive negative electrode active material has favorable stability and suppresses or delays gas generation.

Moreover, the negative electrode active material preferably has such an intensity ratio satisfying the following formula 1:

$$1.1A \geq B \quad \text{(formula 1)},$$

where A represents a peak maximum value of amorphous Si present near 466 $cm^{-1}$, and B represents a peak maximum value of crystalline Si present near 500 $cm^{-1}$, the values being obtained from a Raman spectrum when the negative electrode active material is measured by Raman spectroscopy.

In this case, the A and the B particularly preferably satisfy the following formula 2:

$$0.95A \geq B \quad \text{(formula 2)}.$$

When such formula 1, particularly formula 2, is satisfied, the amount of crystalline Si portion is relatively small, while the amount of amorphous Si portion is relatively large. When the proportion of the crystalline Si portion present is reduced, the slurry stability can be improved because the gas generated by reaction between Li silicide and water is hydrogen, and this reaction takes place between the Si portion and $OH^-$ in a slurry that exhibits alkalinity by the Li doping.

More preferably, in the inventive negative electrode active material, the A and the B satisfy the following formula 3, and a Si component contained as a simple substance in the negative electrode active material is substantially amorphous Si, $$0.1A \geq B \quad \text{(formula 3)}.$$

Considering the aforementioned reaction, it is desirable that the Si component contained as a simple substance in the negative electrode active material be substantially amorphous Si. This is because the area that comes into contact with water in the slurry is substantially reduced.

Further, the negative electrode active material preferably satisfies the following formula 4:

$$0.2C \geq D \quad \text{(formula 4)},$$

where C represents a maximum peak value of $Li_2SiO_3$ present near -75 ppm, and D represents a maximum peak value of $Li_2Si_2O_5$ present near -93 ppm, among peaks obtained when the negative electrode active material is measured by $^{29}Si$-MAS-NMR.

When such formula 4 is satisfied, the proportion of $Li_2SiO_3$ present is high, and further slurry stabilization is expected.

Additionally, the negative electrode active material particles preferably have a median diameter of 2.0 μm or more and 12 μm or less.

When the negative electrode active material particles have a median diameter of 2.0 μm or more, the reaction area with water in an aqueous slurry is not so large that the slurry is likely to be stable. Meanwhile, when the median diameter is 12 μm or less, the reaction area is so small that gas generation can be suppressed, and precipitation of the active material in the slurry can also be suppressed.

Further, the negative electrode active material particles preferably each have a surface layer portion containing a carbon material. In this case, the carbon material preferably has an average thickness of 5 nm or more and 500 nm or less.

The presence of a carbon material not only facilitates electric conductivity and handleability as a battery material, but also improves the slurry stability. When the average thickness of the carbon material is 500 nm or less, the stability is improved, the merit of the silicon oxide to improve the battery capacity is sufficiently appreciated.

Furthermore, the present invention provides a method for producing a negative electrode active material containing negative electrode active material particles, the method comprising steps of:

preparing silicon compound particles each containing a silicon compound that contains oxygen;

inserting Li into the silicon compound particles to incorporate at least one of $Li_2SiO_3$ and $Li_2Si_2O_5$ into the silicon compound particles so as to prepare the negative electrode active material particles;

further selecting, from the prepared negative electrode active material particles, such negative electrode active material particles each having a peak P derived from the Li silicate and located near 1847 eV and a peak Q gentler than the peak P and located near 1851 to 1852 eV in a Si K-edge spectrum obtained from XANES spectra when the prepared negative electrode active material particles are subjected to XANES measurement; and using the selected negative electrode active material particles to produce a negative electrode active material.

According to such a method for producing a negative electrode active material, when the produced negative electrode active material is used as a negative electrode active material for secondary battery, the slurry is surely stabilized, and the battery capacity is successfully increased.

Advantageous Effects of Invention

The inventive negative electrode active material, when used as a negative electrode active material for a secondary battery, enables high first time efficiency, high capacity, and suitable slurry stability for the production. Moreover, a secondary battery according to the present invention containing this negative electrode active material can be produced industrially advantageously, and has favorable battery capacity and first time charge-discharge characteristics. Further, the same effects can also be obtained from electronic devices, electric tools, electric vehicles, power storage systems, and so on which use the secondary battery of the present invention.

Furthermore, the inventive method for producing a negative electrode active material makes it possible to produce a negative electrode active material capable of stabilizing a slurry in producing an electrode, and capable of exhibiting high capacity and favorable initial charge-discharge characteristics when the negative electrode active material is used for a secondary battery.

DESCRIPTION OF EMBODIMENTS

Hereinafter, embodiments of the present invention will be described, but the present invention is not limited thereto.

As described above, as a technique to increase the battery capacity of lithium-ion secondary battery, there has been investigated the use of a negative electrode mainly made from silicon oxide as a negative electrode for lithium-ion secondary battery. Such a lithium-ion secondary battery using silicon oxide is desired to have initial charge-discharge characteristics almost equivalent to those of a lithium-ion secondary battery using a carbon-based active material. In addition, the Li-doped SiO that can improve initial charge-discharge characteristics is desired to exhibit slurry stability almost equivalent to that with a carbon-based active material. However, there has not been proposed a negative electrode active material that imparts initial charge-discharge characteristics equivalent to those by a carbon-based active material and exhibits slurry stability equivalent to that by a carbon-based active material when used as a negative electrode active material for lithium-ion secondary battery.

Accordingly, the present inventors have diligently investigated to obtain a negative electrode active material that is capable of stabilizing a slurry when the negative electrode active material is used for a secondary battery, and capable of improving initial charge-discharge characteristics and consequently increasing the battery capacity; thereby, providing the present invention.

[Inventive Negative Electrode Active Material]

A negative electrode active material according to the present invention contains negative electrode active material particles. Moreover, the negative electrode active material particles include silicon compound particles each containing a silicon compound that contains oxygen. Further, this silicon compound particle contains at least one of Li$_2$SiO$_3$ and Li$_2$Si$_2$O$_5$. Furthermore, in a Si K-edge spectrum obtained from a XANES spectrum, this silicon compound particle has: a peak P which is derived from the Li silicate and located near 1847 eV; and a peak Q which is gentler than the peak P and located near 1851 to 1852 eV. Additionally, such a peak present "near 1847 eV" refers to a peak whose maximum point is located in a range of approximately 1846 eV or more and 1848 eV or less. A peak present "near 1851 to 1852 eV" refers to a peak whose maximum point is located in a range of approximately 1850.5 eV or more and less than 1852.5 eV. The peak Q appears as a peak with a gentle slope. The peak Q as such a gentle peak should be a peak that can be separated from a spectrum by fitting software or the like and verified. Moreover, the peak Q may appear as a shoulder peak. Here, the "peak Q gentler than the peak P" means that the "peak intensity/half value width" of the peak Q is smaller than that the "peak intensity/half value width" of the peak P.

Since the inventive negative electrode active material contains negative electrode active material particles including silicon compound particles, the battery capacity can be improved. Moreover, since the silicon compound particles contain a Li compound (at least one of Li$_2$SiO$_3$ and Li$_2$Si$_2$O$_5$), irreversible capacity generated in charging can be reduced.

The peak Q obtained by XANES measurement from the silicon compound particles contained in the inventive negative electrode active material is presumably a peak derived from a cristobalite-type structure of SiO$_2$. In this way, the inventive negative electrode active material contains, as a SiO$_2$ structure, more stable cristobalite-type structure (structure resembling cristobalite structure) (than quartz structure etc.). This makes slurry stability high. Thus, it is possible to improve the stability of an aqueous slurry prepared by mixing this negative electrode active material in producing a negative electrode, and to suppress gas generation.

Moreover, the inventive negative electrode active material preferably has such an intensity ratio satisfying the following formula 1:

$$1.1A \geq B \quad \text{(formula 1)},$$

where A represents a peak maximum value of amorphous Si present near 466 cm$^{-1}$, and B represents a peak maximum value of crystalline Si present near 500 cm$^{-1}$, the values being obtained from a Raman spectrum when the negative electrode active material is measured by Raman spectroscopy.

Note that "near 466 cm$^{-1}$" means a range of approximately 455 to 479 cm$^{-1}$, while "near 500 cm$^{-1}$" means a range of approximately 480 to 520 cm$^{-1}$.

Satisfying the formula 1 means that the amount of amorphous Si present in the negative electrode active material particles of the inventive negative electrode active material is large relative to the amount of crystalline Si present by certain percentage. The detection of the crystalline Si obtained from a Raman spectrum is related to enlargement of the crystalline Si. Li compounds exhibit alkalinity in aqueous slurry. Enlarged Si reacts with OH$^-$ in the alkali, generating hydrogen gas. Based on these, the slurry stability can be further enhanced by keeping such a state where the Si enlargement is suppressed, that is, keeping amorphous-like Si state.

In this case, the A and the B particularly preferably satisfy the following formula 2:

$$0.95A \geq B \quad \text{(formula 2)}.$$

As shown by the formula 2, the proportion of the amorphous Si present is preferably larger than that of the crystalline Si, that is, the Si state is rather close to amorphous.

The slurry is desirably stable for two or more days between the preparation and the application (coating) step. This is based on the production viewpoint; the slurry is transported and stored until the latter step in this period.

Further, the A and the B preferably satisfy the following formula 3:

$$0.1A \geq B \quad \text{(formula 3)}.$$

When the formula 3 is satisfied, it can be said that the Si component contained as a simple substance in the negative electrode active material is substantially amorphous Si. Above all, it is particularly preferable that no peak be detected near 500 cm$^{-1}$ in the Raman spectrum.

Furthermore, the inventive negative electrode active material preferably satisfies the following formula 4:

$$0.2C \geq D \quad \text{(formula 4)},$$

where C represents a maximum peak value of Li$_2$SiO$_3$ present near −75 ppm, and D represents a maximum peak value of Li$_2$Si$_2$O$_5$ present near −93 ppm, among peaks obtained when the negative electrode active material is measured by $^{29}$Si-MAS-NMR.

The formula 4 means that more Li$_2$SiO$_3$ is present than Li$_2$Si$_2$O$_5$ as the Li silicate forming the Li compound. Li$_2$Si$_2$O$_5$ is more insoluble in water and thus more stable than Li$_2$SiO$_3$. Nevertheless, when Li$_2$Si$_2$O$_5$ is formed, Si is likely to enlarge. Accordingly, when more Li$_2$SiO$_3$ is present, the slurry stability can be increased by suppressing the influence of enlarged Si.

Additionally, the inventive negative electrode active material particles preferably have a median diameter of 2.0 μm or more and 12 μm or less. In this respect, reducing the particle diameters consequently increases the surface area of Si particles. Preferably, the inventive negative electrode active material particles have Si in amorphous state, and the negative electrode active material particles have appropriate surface area. Such appropriate surface area provides appropriate reaction area, and can further stabilize the slurry. When the median diameter of the negative electrode active material particles is 2.0 μm or more and 12 μm or less, this enables the negative electrode active material particles to have appropriate surface area. Increasing the particle diameters reduces the reaction area, so that gas generation can be suppressed. Nevertheless, if the particle diameters are too large, the powder and solid contents are likely to precipitate. Thus, the median diameter is preferably 12 μm or less.

Moreover, each of the negative electrode active material particles preferably has a surface layer portion containing a carbon material. This carbon material preferably has an average thickness of 5 nm or more and 500 nm or less. Such carbon coating gives electric conductivity and also exhibits certain effect as water resistance. Additionally, the average thickness is preferably 500 nm or less because the battery capacity is not adversely influenced.

[Configuration of Negative Electrode]

Next, description will be given of a configuration of a negative electrode of a secondary battery, which contains the inventive negative electrode active material as described above.

Figure 6:
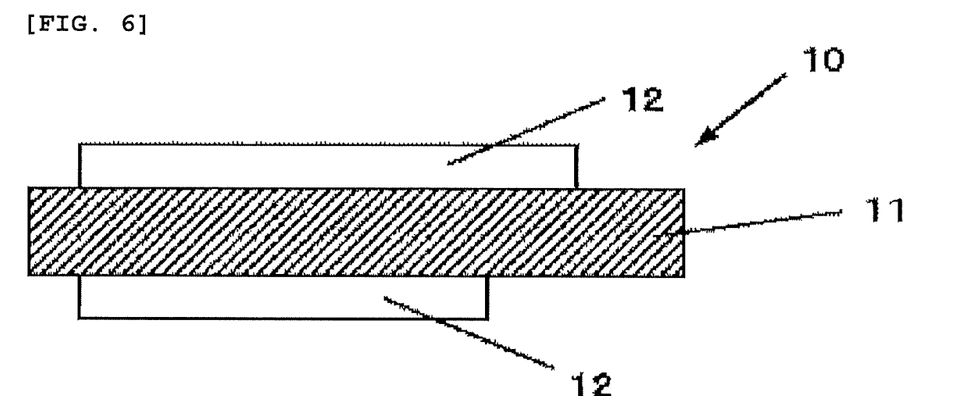
FIG. 6 is a sectional view showing a configuration example of a negative electrode for a non-aqueous electrolyte secondary battery, which contains the inventive negative electrode active material.

FIG. 6 shows a sectional view of a negative electrode containing the inventive negative electrode active material. As shown in FIG. 6, a negative electrode 10 is constituted to have a negative electrode active material layer 12 on a negative electrode current collector 11. The negative electrode active material layer 12 may be disposed on both sides or only one side of the negative electrode current collector 11. Further, as long as the inventive negative electrode active material is used, the negative electrode current collector 11 is not essential.

[Negative Electrode Current Collector]

The negative electrode current collector 11 is made of a highly electric conductive and mechanically strong material. Examples of the electric conductive material usable for the negative electrode current collector 11 include copper (Cu) and nickel (Ni). This electric conductive material is preferably a material that does not form an intermetallic compound with lithium (Li).

The negative electrode current collector 11 preferably contains carbon (C) and sulfur (S) besides the main element because these elements improve the physical strength of the negative electrode current collector. In particular, when an active material layer that expands in charging is disposed, the current collector containing the above elements has an effect of suppressing deformation of the electrode including the current collector. Each content of the contained elements is not particularly limited, but is preferably 100 ppm by mass or less. This is because a higher effect of suppressing deformation is obtained. Such an effect of suppressing deformation can further improve the cycle characteristics.

Additionally, the surface of the negative electrode current collector 11 may or may not be roughened. Examples of the roughened negative electrode current collector include a metallic foil subjected to an electrolyzing process, an embossing process, or a chemical etching process; etc. Examples of the negative electrode current collector that is not roughened include a rolled metallic foil, etc.

[Negative Electrode Active Material Layer]

The negative electrode active material layer 12 may contain, besides the inventive negative electrode active material (silicon-based active material particles), multiple types of negative electrode active materials, such as a carbon-based active material. Depending on battery design, other materials may be further contained, such as a thickener (also referred to as "binding agent", "binder"), a conductive assistant agent, etc. As described above, the negative electrode active material contains negative electrode active material particles, and the negative electrode active material particles include silicon compound particles containing an oxygen-containing silicon compound.

As mentioned above, the negative electrode active material layer 12 may contain a mixed negative electrode active material that contains: the inventive negative electrode active material (silicon-based negative electrode active material) and a carbon-based active material. This makes it possible to decrease the electric resistance of the negative electrode active material layer and to ease the expanding stress due to charging. Examples of usable carbon-based active materials include pyrolytic carbons, cokes, glassy carbon fiber, calcined organic polymer compounds, carbon black, etc.

Additionally, as the negative electrode binding agent contained in the negative electrode active material layer, any one or more of polymer material, synthetic rubber, and so on are usable, for example. Examples of the polymer material include polyvinylidene fluoride, polyimide, polyamideimide, aramid, polyacrylic acid, lithium polyacrylate, sodium polyacrylate, carboxymethyl cellulose, etc. Examples of the synthetic rubber include styrene-butadiene rubber, fluoro-rubber, ethylene-propylene-diene, etc.

As the negative electrode conductive assistant agent, any one or more of carbon materials, such as carbon black, acetylene black, graphite, ketjen black, carbon nanotube, and carbon nanofiber are usable, for example.

The negative electrode active material layer is formed by an application method, for example. The application method is a method in which: the silicon-based negative electrode active material is mixed with the above binder and so on, and optionally with a conductive assistant agent or a carbon-based active material; and the mixture is then applied while being dispersed in organic solvent, water, or the like.

Further, the inventive negative electrode active material contains silicon compound particles as described above. The silicon compound particles are each a silicon oxide material containing an oxygen-containing silicon compound. This silicon compound preferably contains silicon and oxygen as $SiO_x$ in a ratio within $0.5 \leq x \leq 1.6$. When "x" is 0.5 or more, the oxygen proportion is higher than that of silicon single substance, making the cycle characteristics favorable. When "x" is 1.6 or less, the resistance of silicon oxide is not too high and is preferable. Particularly, in the composition of $SiO_x$, "x" is preferably close to 1 because higher cycle characteristics are obtained. Note that the composition of the silicon compound in the present invention does not necessarily mean purity of 100%, and may contain a small quantity of impurity elements.

Furthermore, in the inventive negative electrode active material, each silicon compound particle contains at least one of $Li_2SiO_3$ and $Li_2Si_2O_5$. These Li silicates are more stable than other Li compounds. Accordingly, the silicon-based active material containing these Li compound(s) achieves more stable battery characteristics. These Li compounds can be obtained by selectively changing a part of $SiO_2$ component formed in the silicon compound to a Li compound to thus modify the silicon compound. Moreover, these are $SiO_2$ components in a silicon compound which become unstable upon insertion and release of lithium when a battery is charged and discharged. Thus, these components are modified to other lithium silicates in advance, so that the Si irreversible capacity generated in charging can be reduced.

In addition, when at least one or more of $Li_2SiO_3$ and $Li_2Si_2O_5$ are present in the bulk of the silicon compound particles, the battery characteristics are improved. Particularly, when more $Li_2SiO_3$ is present, the characteristics are further improved. This is as described above in relation to the formula 4.

Note that these lithium silicates can be quantified by NMR (Nuclear Magnetic Resonance). The NMR measurement can be performed under the following conditions, for example.

$^{29}$Si MAS NMR (Magic Angle Spinning-Nuclear Magnetic Resonance)

Apparatus: a 700-NMR spectroscope made by Bruker Corp.,

Probe: a 4-mm HR-MAS rotor, 50 µL,

Sample Spinning Speed: 10 kHz,

Measurement Environment Temperature: 25° C.

Moreover, the cristobalite-type structure (cristobalite-like structure) in the silicon compound can be verified from a XANES region by XAFS (X-ray absorption fine structure) measurement. The measurement can be performed under the following conditions, for example.

XAFS

Si K-edge

Measurement site: BL6N1 in Aichi Synchrotron Radiation Center

Accelerating energy of 1.2 GeV,

Accumulated current value of 300 mA

Monochromatic condition: white X-ray from a bending magnet is made monochromatic with a 2-crystal spectroscope and utilized for the measurement Focusing condition: focusing in vertical and horizontal directions with Ni-coated bending cylindrical mirror Upstream slit opening: 7.0 mm in a horizontal direction× 3.0 mm in a vertical direction, Beam size: 2.0 mm in a horizontal direction×1.0 mm in a vertical direction Incident angle to sample: normal incidence (incident angle of 0°)

Energy calibration: peak position of $K_2SO_4$ at the S-K edge is calibrated to 2481.70 eV Measurement method: all-electron yield method by measuring sample current $I_0$ measurement method: in XANES measurement, Au-mesh Sample environment: transferred using a transfer vessel for the transportation without exposing to the atmosphere, a basic vacuum degree of a measurement bath: $5 \times 10^{-7}$ Pa

[Method for Producing Negative Electrode]

Next, description will be given of an example of a method for producing the inventive negative electrode active material.

First, a method for producing a negative electrode material to be contained in the negative electrode will be described. In the beginning, silicon compound particles containing an oxygen-containing silicon compound are prepared. This silicon compound is preferably $SiO_x$: $0.5 \leq x \leq 1.6$. Next, Li is inserted into the silicon compound particles to incorporate at least one of $Li_2SiO_3$ and $Li_2Si_2O_5$ into the silicon compound particles. Thereby, negative electrode active material particles are prepared. Next, the prepared negative electrode active material particles are subjected to XANES measurement to select negative electrode active material particles each of which has a peak P derived from the Li silicate and located near 1847 eV and a peak Q gentler than the peak P and located near 1851 to 1852 eV in a Si K-edge spectrum obtained from the XANES spectra. The negative electrode active material particles selected in this manner are used to produce a negative electrode active material.

More specifically, the negative electrode material is produced, for example, by the following procedure.

In the beginning, silicon compound particles containing an oxygen-containing silicon compound are prepared. Hereinbelow, description will be given of a case where silicon oxide shown by $SiO_x$ ($0.5 \leq x \leq 1.6$) is used as the oxygen-containing silicon compound. First, a raw material which generates silicon oxide gas is heated in the presence of inert gas under reduced pressure in a temperature range of 900° C. to 1600° C. to generate silicon oxide gas. In this event, a mixture of metallic silicon powder with silicon dioxide powder can be used as the raw material. In consideration of the existence of oxygen on the surface of the metallic silicon powder and slight oxygen in a reaction furnace, the mixing mole ratio is desirably in a range of 0.8<metallic silicon powder/silicon dioxide powder<1.3.

The generated silicon oxide gas is solidified and deposited on an absorbing plate. Subsequently, the deposit of silicon oxide is taken out under the condition of the temperature in the reaction furnace being lowered to 100° C. or below. The deposit is then ground and powdered using a ball mil, a jet mil, or the like. As described above, the silicon compound particles can be prepared. Note that the Si crystallites in the silicon compound particles can be controlled by changing the evaporation temperature of the raw material which generates silicon oxide gas, or by a heat treatment after the preparation of the silicon compound particles.

Here, on the surface layer of the silicon compound particle, a carbon material layer may be formed. As a method to form the carbon material layer, a thermal decomposition CVD method is desirable. Hereinafter, an example of the method for forming a carbon material layer by thermal decomposition CVD method will be described.

First, the silicon compound particles are set in a furnace. Then, a hydrocarbon gas is introduced into the furnace, and the temperature in the furnace is raised. The pyrolysis temperature is not particularly limited, but is preferably 1200° C. or less, more preferably 900° C. or less. When the pyrolysis temperature is 1200° C. or less, it is possible to prevent unintentional disproportionation of the active material particles. After raising the furnace temperature to a prescribed temperature, a carbon layer is formed on the surface of the silicon compound particle. Additionally, the hydrocarbon gas to be the raw material of the carbon material is not particularly limited, but preferably has a composition of $C_nH_m$ where $n \le 3$. When $n \le 3$, it is possible to decrease the production cost and to improve the properties of the decomposition products.

Next, Li is inserted into the silicon compound particles prepared as described above. Thereby, negative electrode active material particles including the lithium-inserted silicon compound particles are prepared. Specifically, the silicon compound particles are thus modified such that the Li compound (at least one of $Li_2SiO_3$ and $Li_2Si_2O_5$) is formed inside the silicon compound particles. Li is preferably inserted by an oxidation-reduction method.

In the modification by the oxidation-reduction method, for example, first, lithium is dissolved in an ether-based solvent to prepare a solution A. The silicon active material particles are immersed in the solution A, so that lithium can be inserted. The solution A may further contain a polycyclic aromatic compound or a linear polyphenylene compound. After the lithium insertion, the silicon active material particles may be immersed in a solution B containing a polycyclic aromatic compound or a derivative thereof to release active lithium from the silicon active material particles. As a solvent of the solution B, for example, an ether-based solvent, a ketone-based solvent, an ester-based solvent, an alcohol-based solvent, an amine-based solvent, or a mixed solvent thereof can be used. Alternatively, after immersed in the solution A, the resulting silicon active material particles may be heated in inert gas. The heat treatment can stabilize the Li compound. Then, washing may be performed, for example, by a washing method with alcohol, alkaline water in which lithium carbonate is dissolved, weak acid, pure water, or the like.

As the ether-based solvent used in the solution A, it is possible to use diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, mixed solvents thereof, etc. Among these, tetrahydrofuran, dioxane, and 1,2-dimethoxy ethane are particularly preferably used. These solvents are preferably dehydrated, and preferably deoxygenized.

Moreover, as the polycyclic aromatic compound contained in the solution A, it is possible to use one or more kinds of naphthalene, anthracene, phenanthrene, naphthacene, pentacene, pyrene, picene, triphenylene, coronene, chrysene, and derivatives thereof. As the linear polyphenylene compound, it is possible to use one or more kinds of biphenyl, terphenyl, and derivatives thereof.

As the polycyclic aromatic compound contained in the solution B, it is possible to use one or more kinds of naphthalene, anthracene, phenanthrene, naphthacene, pentacene, pyrene, picene, triphenylene, coronene, chrysene, and derivatives thereof.

Moreover, as the ether-based solvent of the solution B, it is possible to use one or more kinds of diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, etc., and mixed solvents thereof.

As the ketone-based solvent, it is possible to use acetone, acetophenone, etc.

As the ester-based solvent, it is possible to use methyl formate, methyl acetate, ethyl acetate, propyl acetate, isopropyl acetate, etc.

As the alcohol-based solvent, it is possible to use methanol, ethanol, propanol, isopropyl alcohol, etc.

As the amine-based solvent, it is possible to use methylamine, ethylamine, ethylenediamine, etc.

After the Li doping treatment by the oxidation-reduction method, the material may be filtered followed by heating at 500° C. or more and 650° C. or less to control the kind, amount (existence proportion), or the like of the Li silicate. In such control, it is important to perform the heat treatment in vacuum state or inert gas. Moreover, it is desirable to employ uniform heat treatment with such a heating apparatus as a rotary kiln, although the apparatus is not limited. In this event, various Li silicate states can be created by setting vacuum state, inert-gas flow rate (inner pressure), retort thickness, and the number of revolutions as factors. Those skilled in the art can experimentally easily determine what Li silicate state is obtained under what conditions. Similarly, silicon enlargement or silicon amorphization can be controlled. Those skilled in the art can experimentally easily determine under what conditions these are controlled.

Meanwhile, an organic solvent may remain on the material surface after the filtration, although the amount is slight. Hence, a decomposition product of the organic solvent may partially remain which is different from the carbon layer derived from hydrocarbon. Accordingly, to control the specific surface area appropriately, the carbon material attributable to the organic solvent is desirably reduced.

The negative electrode active material prepared as described above is mixed with other materials, such as a negative electrode binding agent and a conductive assistant agent, to form a negative electrode mixture. Then, an organic solvent, water, or the like is added thereto to form slurry. Subsequently, the slurry is applied onto the surface of a negative electrode current collector and dried to form a negative electrode active material layer. In this event, heat pressing and so on may be performed as necessary. As described above, a negative electrode is successfully produced.

<Lithium-Ion Secondary Battery>

Next, a lithium-ion secondary battery of a laminate film type is described as a concrete example of the inventive non-aqueous electrolyte secondary battery.

[Configuration of Laminate Film Type Secondary Battery]

Figure 7:
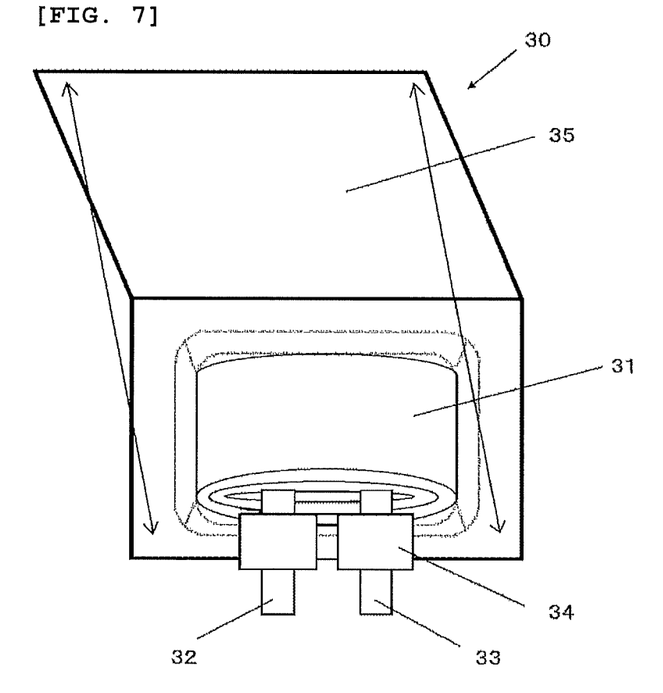
FIG. 7 is an exploded diagram showing a configuration example (laminate film type) of a lithium-ion secondary battery that contains the inventive negative electrode active material.

A laminate film type lithium-ion secondary battery 30 shown in FIG. 7 mainly includes a wound electrode body 31 stored in sheet-shaped outer parts 35. This wound electrode body 31 is formed by winding a positive electrode, a negative electrode, and a separator disposed between these electrodes. There is also a case storing a laminate having a separator disposed between a positive electrode and a negative electrode without winding. The electrode bodies of both types have a positive-electrode lead 32 attached to the positive electrode and a negative-electrode lead 33 attached to the negative electrode. The outermost circumference of the electrode bodies is protected by a protecting tape.

The positive-electrode lead 32 and the negative-electrode lead 33, for example, extend from the interior of the outer parts 35 toward the exterior in one direction. The positive-electrode lead 32 is made of, for example, a conductive material, such as aluminum. The negative-electrode lead 33 is made of, for example, a conductive material, such as nickel or copper.

An example of the outer part 35 is a laminate film composed of a fusion-bond layer, a metallic layer, and a surface protecting layer stacked in this order. Two laminate films are fusion-bonded or stuck with an adhesive or the like at the outer edges of their fusion-bond layers such that each fusion-bond layer faces the electrode body 31. The fusion-bond portion is for example a film, such as a polyethylene or polypropylene film. The metallic portion is aluminum foil, etc. The protecting layer is for example nylon, etc.

The space between the outer parts 35 and the positive- and negative-electrode leads is filled with close adhesion films 34 to prevent air from entering therein. Exemplary materials of the close adhesion films include polyethylene, polypropylene, and polyolefin resins.

The positive electrode has a positive electrode active material layer disposed on one side or both sides of a positive electrode current collector like the negative electrode 10 shown in FIG. 6, for example.

The positive electrode current collector is made of, for example, a conductive material, such as aluminum.

The positive electrode active material layer contains any one kind or two kinds or more of positive electrode materials capable of occluding and releasing lithium ions, and may contain a positive electrode binding agent, a positive electrode conductive assistant agent, a dispersing agent, or other materials according to design. The same detailed description as described for the negative electrode binding agents and negative electrode conductive assistant agent, for example, can be given for the positive electrode binding agent and the positive electrode conductive assistant agent in this case.

The positive electrode material is preferably a compound containing lithium. Examples of the lithium-containing compound include complex oxides each composed of lithium and a transition metal element, and phosphate compounds each containing lithium and a transition metal element. Among these positive electrode materials, a compound containing at least one of nickel, iron, manganese, and cobalt is preferable. The chemical formula of such compounds is expressed by, for example, $Li_xM_1O_2$ or $Li_yM_2PO_4$. In the formulae, $M_1$ and $M_2$ represent at least one kind of transition metal elements. "x" and "y" each represent a value varied depending on a charging or discharging status of a battery, which typically satisfy $0.05 \leq x \leq 1.10$ and $0.05 \leq y \leq 1.10$.

Examples of the complex oxides composed of lithium and a transition metal element include a lithium cobalt complex oxide ($Li_xCoO_2$), a lithium nickel complex oxide ($Li_xNiO_2$), a lithium-nickel-cobalt complex oxide, etc. Examples of the lithium-nickel-cobalt complex oxide include lithium-nickel-cobalt-aluminum complex oxide (NCA), lithium-nickel-cobalt-manganese complex oxide (NCM), etc.

Examples of the phosphate compounds containing lithium and a transition metal element include a lithium-iron-phosphate compound ($LiFePO_4$), a lithium-iron-manganese-phosphate compound ($LiFe_{1-u}Mn_uPO_4$ ($0<u<1$)), etc. Higher battery capacity and excellent cycle characteristics can be obtained using these positive electrode materials.

[Negative Electrode]

The negative electrode has a configuration which is similar to that of the above negative electrode 10 for a lithium-ion secondary battery shown in FIG. 6, and, for example, has the negative electrode active material layers disposed on both faces of the current collector. The negative electrode preferably has a negative-electrode charge capacity larger than electrical capacitance (battery charge capacity) provided by the positive electrode active material. This negative electrode itself can suppress the precipitation of lithium metal.

The positive electrode active material layer is formed partially on both faces of the positive electrode current collector. Similarly, the negative electrode active material layer is also formed partially on both faces of the negative electrode current collector. In this case, the negative electrode active material layer provided on the negative electrode current collector, for example, has a region which does not face any positive electrode active material layer. This intends to perform a stable battery design.

The area at which the positive and negative electrode active material layers do not face one another is hardly affected by charging and discharging. The status of the negative electrode active material layer is consequently retained since its formation. This enables repeatable high-precision investigation of, for example, the composition of negative electrode active material without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramic, or two or more stacked porous films to give laminate structure. Examples of the synthetic resin include polytetrafluoroethylene, polypropylene, polyethylene, etc.

[Electrolytic Solution]

At least a part of the active material layers or the separator is impregnated with a liquid electrolyte (electrolytic solution). This electrolytic solution is composed of electrolyte salt dissolved in a solvent and may contain other materials such as additives.

The solvent to be used may be, for example, a non-aqueous solvent. Examples of the non-aqueous solvent include ethylene carbonate, propylene carbonate, butylene carbonate, dimethyl carbonate, diethyl carbonate, ethylmethyl carbonate, methylpropyl carbonate, 1,2-dimethoxyethane, tetrahydrofuran, etc. Among these, at least one or more of ethylene carbonate, propylene carbonate, dimethyl carbonate, diethyl carbonate, or ethylmethyl carbonate are preferably used because such solvent(s) enable better characteristics. In this case, superior characteristics can be obtained by combined use of a high-viscosity solvent, such as ethylene carbonate or propylene carbonate, and a low-viscosity solvent, such as dimethyl carbonate, ethylmethyl carbonate, or diethyl carbonate because the dissociation of electrolyte salt and ionic mobility are improved.

When an alloyed negative electrode is used, the solvent particularly preferably contains at least one of halogenated chain carbonate ester and halogenated cyclic carbonate ester. Such a solvent enables the negative electrode active material to be coated with a stable coating at charging or discharging, particularly charging. The halogenated chain carbonate ester is chain carbonate ester having halogen as a constituent element (at least one hydrogen is substituted by halogen). Moreover, the halogenated cyclic carbonate ester is cyclic carbonate ester having halogen as a constituent element (i.e., at least one hydrogen is substituted by halogen).

The kind of halogen is not particularly limited, but fluorine is preferable. This is because fluorine enables the formation of better coating than other halogens do. A larger number of halogens are better because a more stable coating can be obtained which reduces a decomposition reaction of the electrolytic solution.

Examples of the halogenated chain carbonate ester include fluoromethyl methyl carbonate, difluoromethyl methyl carbonate, etc. Examples of the halogenated cyclic carbonate ester include 4-fluoro-1,3-dioxolane-2-one, 4,5-difluoro-1,3-dioxolane-2-one, etc.

The solvent preferably contains an unsaturated carbon bond cyclic carbonate ester as an additive because this enables the formation of a stable coating on the negative electrode surface at charging and discharging and the inhibition of a decomposition reaction of the electrolytic solution. Examples of the unsaturated carbon bond cyclic carbonate ester include vinylene carbonate, vinyl ethylene carbonate, etc.

In addition, the solvent preferably contains sultone (cyclic sulfonic acid ester) as an additive because this enables improvement in chemical stability of a battery. Examples of the sultone include propane sultone and propene sultone.

In addition, the solvent preferably contains acid anhydride because this enables improvement in chemical stability of the electrolytic solution. An example of the acid anhydride includes propane disulfonic acid anhydride.

The electrolyte salt may contain, for example, at least one light metal salt, such as lithium salt. Examples of the lithium salt include lithium hexafluorophosphate ($LiPF_6$), lithium tetrafluoroborate ($LiBF_4$), etc.

The content of the electrolyte salt in the solvent is preferably 0.5 mol/kg or more and 2.5 mol/kg or less. This is because high ionic conductivity is achieved.

[Method of Producing Laminate Film Type Secondary Battery]

In the beginning, a positive electrode is produced with the above positive electrode material. A positive electrode mixture is first created by mixing the positive electrode active material with as necessary the positive electrode binding agent, the positive electrode conductive assistant agent, and other materials, and then dispersed in an organic solvent to form slurry of the positive-electrode mixture. Subsequently, the mixture slurry is applied to a positive electrode current collector with a coating apparatus such as a die coater having a die head or a knife roll, and dried by hot air to obtain a positive electrode active material layer. The positive electrode active material layer is finally compressed with, for example, a roll press. In this event, heating may be performed, and the compression may be repeated multiple times.

Secondly, a negative electrode active material layer is formed on a negative electrode current collector to produce a negative electrode through the same procedure as in the above production of the negative electrode 10 for a lithium-ion secondary battery.

In producing the positive electrode and the negative electrode, the active material layers are formed on both faces of the positive and negative electrode current collectors. In this event, in both the electrodes, the length of these active material layers formed on the faces may differ from one another (see FIG. 6).

Then, an electrolytic solution is prepared. Subsequently, with ultrasonic welding or the like, the positive-electrode lead 32 is attached to the positive electrode current collector and the negative-electrode lead 33 is attached to the negative electrode current collector. Then, the positive and negative electrodes and the separator interposed therebetween are stacked or wound to produce the wound electrode body 31 and a protecting tape is stuck to the outermost circumference of the body. Next, the wound body is flattened. Subsequently, the film-shaped outer part 35 is folded in half to interpose the wound electrode body therebetween. The insulating portions of the outer parts are stuck to one another by heat sealing, thereby the wound electrode body is encapsulated with one direction being opened. Thereafter, the close-adhesion films are inserted between the outer parts and the positive- and negative-electrode leads. Then, the prepared electrolytic solution is introduced in a prescribed amount from the opened side to perform the impregnation of the electrolytic solution under a vacuum. After the impregnation, the opened side is stuck by vacuum heat sealing. In this manner, the laminate film type lithium-ion secondary battery 30 is successfully produced.

EXAMPLE

Hereinafter, the present invention will be more specifically described by showing Examples of the present invention and Comparative Examples. However, the present invention is not limited to these Examples.

Example 1-1

First, a negative electrode active material was prepared as follows. A mixed raw material of metallic silicon and silicon dioxide was introduced into a reaction furnace and evaporated in an atmosphere with a vacuum degree of 10 Pa to deposit the evaporated material on an adsorption plate. The deposit was sufficiently cooled and then taken out to pulverize the deposit with a ball mill. In thus obtained silicon compound particles, the value of "x" in $SiO_x$ was 1.0. Subsequently, the silicon compound particles were classified to adjust the particle sizes. Then, thermal decomposition CVD was performed to coat the surfaces of the silicon compound particles with carbon material.

Subsequently, the silicon compound particles were modified through lithium insertion by the oxidation-reduction method. Then, the resultant was heated in a range of 450° C. to 750° C. for the modification.

The particle diameters of the obtained negative electrode active material particles and the thickness of the carbon coating were measured. Moreover, the presence or absence of $Li_2SiO_3$ and $Li_2Si_2O_5$, and each peak intensity were determined by $^{29}Si$-MAS-NMR. Further, a Si K-edge spectrum obtained from a XANES spectrum of the negative electrode active material particles was measured. The measurement conditions were as described above. From the spectrum, the presence or absence of the peak P near 1847 eV and the peak Q near 1851 to 1852 eV was determined (in the following tables, "c-Si peak" is described to indicate the presence of crystalline Si). Further, peaks around 466 $cm^{-1}$ and around 500 $cm^{-1}$, and each intensity were measured by Raman spectroscopy measurement.

Next, the prepared negative electrode active material, conductive assistant agent-1 (carbon nanotube, CNT), conductive assistant agent-2 (carbon fine particles with a median diameter of about 50 nm), sodium polyacrylate, and carboxymethyl cellulose (hereinafter, referred to as CMC) were mixed in a dry mass ratio of 93:1:1:4:1. This was diluted with pure water to form a negative-electrode mixture slurry. The slurry stability was assessed by packing a portion of this state into an aluminum laminate, and judging the presence or absence of gas generation according to Archimedes method. The precipitation in the slurry was checked by transferring the formed slurry to another vessel to observe over-time change.

As a negative electrode current collector, an electrolytic copper foil with a thickness of 15 μm was used. This electrolytic copper foil contained carbon and sulfur each at a concentration of 70 ppm by mass. Finally, the negative-electrode mixture slurry was applied onto the negative electrode current collector, and dried at 100° C. for 1 hour in a vacuum atmosphere. After drying, the negative electrode had a deposited amount of a negative electrode active material layer per unit area at one side (also referred to as an area density) of 2.5 $mg/cm^2$.

Next, solvents, ethylene carbonate (EC) and dimethyl carbonate (DMC), were mixed, followed by dissolving electrolyte salt (lithium hexafluorophosphate: LiPF$_6$) to prepare an electrolytic solution. In this case, the solvent composition was set to EC:DMC=30:70 in a volume ratio, and the content of the electrolyte salt was set to 1 mol/kg based on the solvents.

Next, a coin cell was assembled as follows. First, a Li foil with a thickness of 1 mm was punched to have a diameter of 16 mm, and stuck on an aluminum cladding. The obtained negative electrode was punched to have a diameter of 15 mm, and faced with the Li foil with a separator interposed therebetween. After the electrolytic solution was poured, a 2032-type coin cell was prepared.

The first time efficiency was measured under the following conditions.

First, the charge rate was set approximately at 0.03C. In this case, the charging was performed at CCCV mode. The CV was 0 V, and the end current was 0.04 mA.

CC discharge was carried out by setting the discharge rate at 0.03C, also. The discharge voltage was 1.2 V.

In investigating the initial charge-discharge characteristics, the first time efficiency (hereinafter, may also be referred to as initial efficiency) was calculated. The first time efficiency was calculated from the equation shown by: first time efficiency (%)=(first time discharge capacity/first time charge capacity)×100.

Examples 1-2, 1-3

Negative electrode active materials were produced in the same manner as in Example 1-1, except for changing the heating temperature and processing atmosphere conditions. Further, each measurement was carried out as in Example 1-1.

Comparative Examples 1 to 3

Negative electrode active materials were produced as in Example 1-1, except that Li doping was not performed. Moreover, after the CVD, the carbon-coated silicon compound particles (SiO—C material) were heated. The heat treatment was performed at 900 degrees in Comparative Example 1, at 1000 degrees in Comparative Example 2, and at 1100 degrees in Comparative Example 3. Further, each measurement was carried out as in Example 1-1.

Comparative Example 4

A negative electrode active material was produced in the same manner as in Example 1-1, except for changing the heating temperature and processing atmosphere conditions. Nevertheless, the heat treatment was performed under such conditions that no peak of 1851 to 1852 eV was observed. Further, each measurement was carried out as in Example 1-1.

Figure 1:
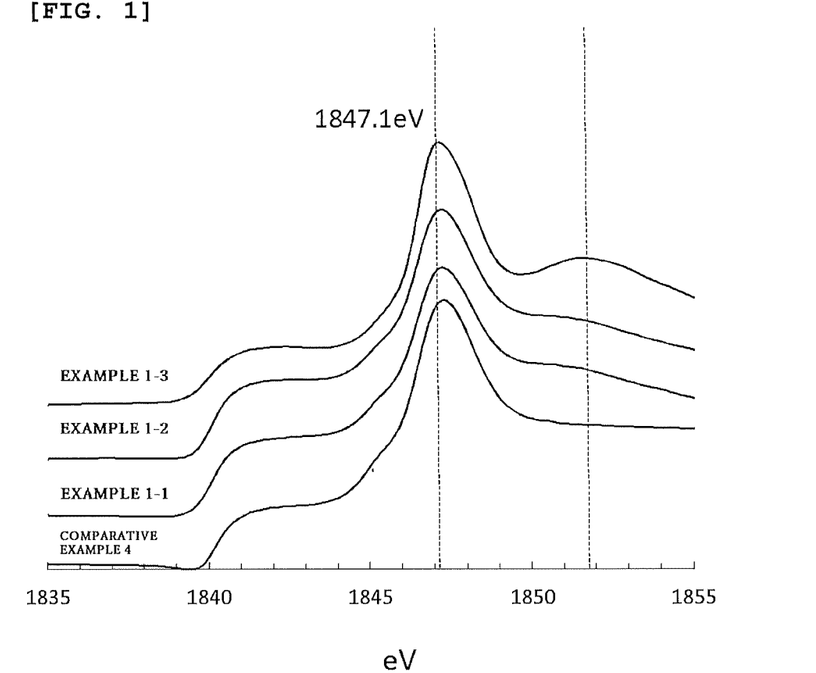
FIG. 1 shows XANES spectra obtained from negative electrode active materials of Examples 1-1 to 1-3 and Comparative Example 4.
Figure 2:
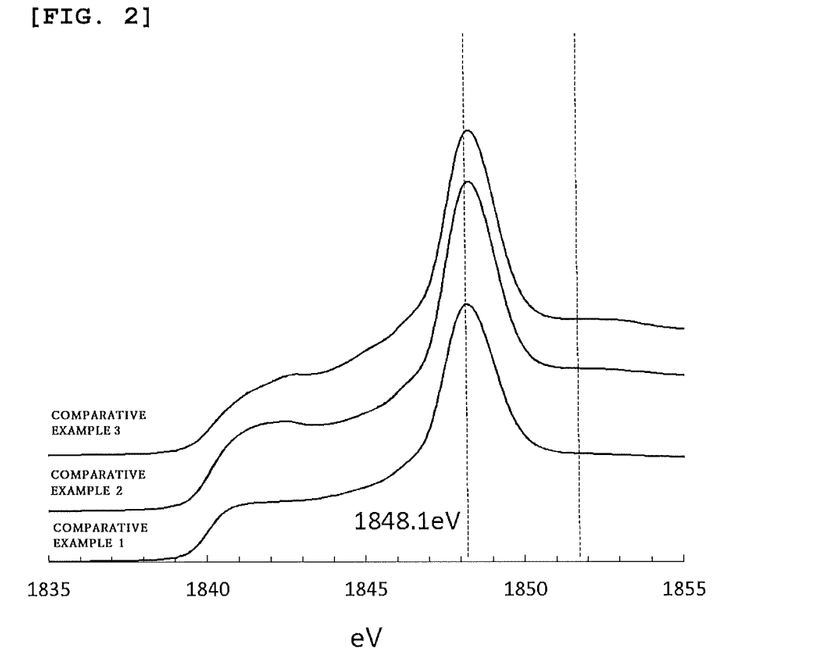
FIG. 2 shows an example of XANES spectra obtained by heating materials before modification by Li doping method (Comparative Examples 1 to 3).
Figure 5:
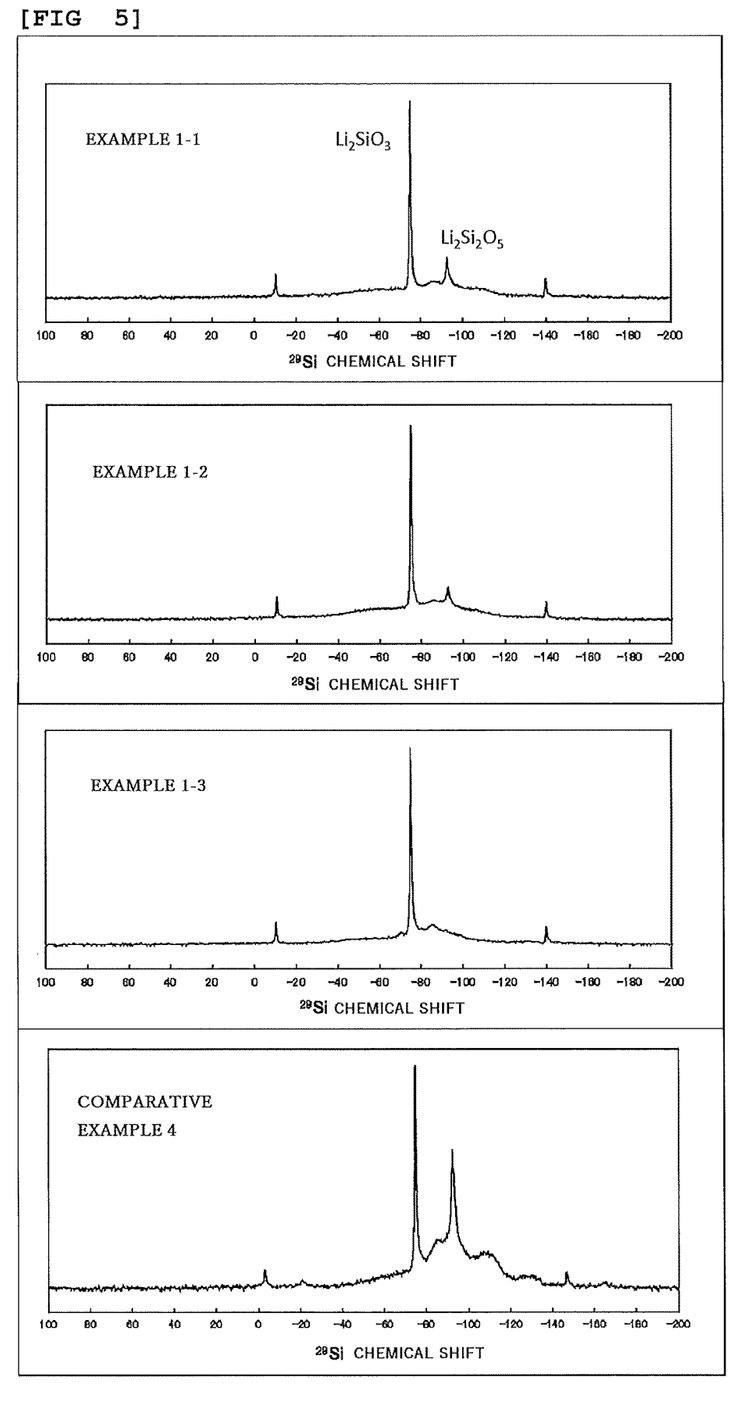
FIG. 5 shows $^{29}$Si-MAS-NMR spectra obtained from the negative electrode active materials of Examples 1-1 to 1-3 and Comparative Example 4.

Table 1 shows the evaluation results of Examples 1-1 to 1-3 and Comparative Examples 1 to 4. Moreover, FIG. 1 shows the XANES spectra obtained from the negative electrode active materials of Examples 1-1 to 1-3 and Comparative Example 4. Further, FIG. 2 shows the XANES spectra obtained from the negative electrode active materials of Comparative Examples 1 to 1-3. Furthermore, FIG. 5 shows the $^{29}$Si-MAS-NMR spectra obtained from the negative electrode active materials of Examples 1-1 to 1-3 and Comparative Example 4.

TABLE 1

| | Slurry stability | First time efficiency (%) | Particle diameter (μm) | Li$_2$SiO$_3$, Li$_2$Si$_2$O$_5$ confirmed by NMR | Si K-edge 1847 eV | 1851 to 1852 eV | Raman ≥B | $^{29}$si-MAS-NMR | Carbon coating layer thickness (nm) |
|---|---|---|---|---|---|---|---|---|---|
| Comparative Example 1 | stable | 68.0 | 6.5 | absent | absent | absent | no C—Si peak | not calculable | 50 |
| Comparative Example 2 | stable | 69.0 | 6.5 | absent | absent | absent | A ≥ B | not calculable | 50 |
| Comparative Example 3 | stable | 70.0 | 6.5 | absent | absent | absent | 1.1A ≥ B | not calculable | 50 |
| Comparative Example 4 | gas generation after 10 hours | 82.0 | 6.5 | Li$_2$SiO$_3$, Li$_2$Si$_2$O$_5$ | present | absent | no C—Si peak | 0.62 | 50 |
| Example 1-1 | gas generation after 55 hours | 86.0 | 6.5 | Li$_2$SiO$_3$, Li$_2$Si$_2$O$_5$ | present | present | no C—Si peak | 0.19 | 50 |
| Example 1-2 | gas generation after 60 hours | 90.1 | 6.5 | Li$_2$SiO$_3$, Li$_2$Si$_2$O$_5$ | present | present | no C—Si peak | 0.16 | 50 |
| Example 1-3 | gas generation after 70 hours | 90.0 | 6.5 | Li$_2$SiO$_3$ | present | present | no C—Si peak | substantially 0 | 50 |

In Examples 1-1 to 1-3, the heating temperature and processing atmosphere conditions varied as mentioned above. Nevertheless, the XANES measurement revealed that there was a peak around 1847 eV, and cristobalite-like structure was obtained in any case. Particularly, increasing the intensity of the XANES peak which is conceivably derived from this structure satisfactorily kept the slurry resistance, i.e. more stable, and also increased the initial efficiency value.

In Comparative Example 4, no peak of 1851 to 1852 eV was observed. The slurry stability was about 10 hours. The result was not favorable.

Comparative Examples 1 to 3 verified such situations that before Li doping is performed, heating the SiO—C material after CVD improves the initial efficiency. As described above, heating was performed at 900 degrees in Comparative Example 1, at 1000 degrees in Comparative Example 2, and at 1100 degrees in Comparative Example 3. These results verified that the initial efficiency is slightly improved along with the temperature. The reason is presumably that heating caused disproportionation, and consequently the efficiency was slightly improved. What should be particularly noted from these results is that no peak was obtained near 1851 to 1852 eV, but peaks near 1853 eV were exhibited after Comparative Example 2. These are presumably of quartz structure (American Mineralogist, Volume 79, pages 622-632, 1994). This structure is different from cristobalite described in Examples.

Examples 2-1 to 2-4

Moreover, negative electrode active materials were produced as in Example 1-1, except that Si crystallinity was controlled by changing the bath temperature during the Li doping and the subsequent heating condition. Further, each measurement was carried out as in Example 1-1.

Figure 3:
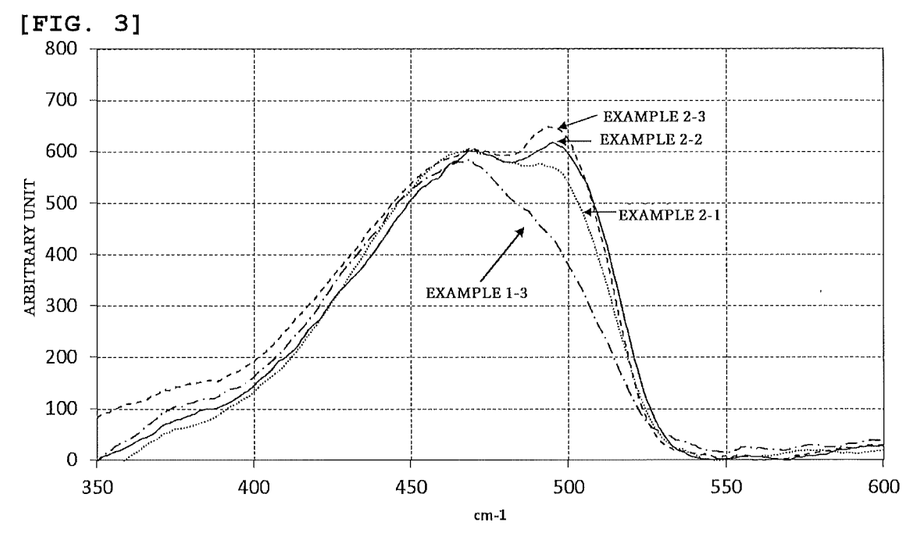
FIG. 3 shows an example of Raman spectra obtained from the inventive negative electrode active materials (Examples 1-3, 2-1 to 2-3).
Figure 4:
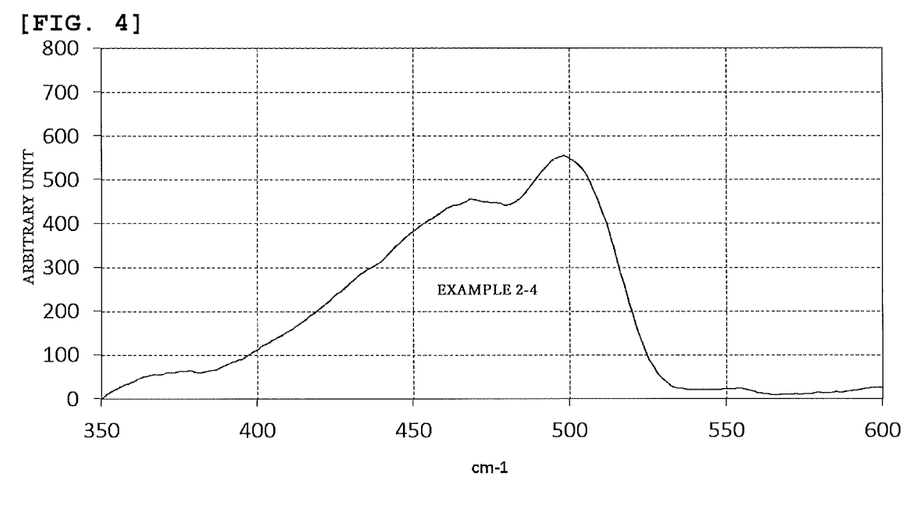
FIG. 4 shows an example of a Raman spectrum obtained from the inventive negative electrode active material (Example 2-4).

Table 2 shows the evaluation results of Examples 2-1 to 2-4. Moreover, FIG. 3 shows the Raman spectra obtained from the negative electrode active materials of Examples 1-3 and 2-1 to 2-3. FIG. 4 shows the Raman spectrum obtained from the negative electrode active material of Example 2-4.

TABLE 2

|  | Slurry stability | First time efficiency (%) | Particle diameter (μm) | $Li_2SiO_3$, $Li_2Si_2O_5$ confirmed by NMR | Si K-edge 1847 eV | 1851 to 1852 eV | Raman ≥B | $^{29}$Si-MAS-NMR | Carbon coating layer thickness (nm) |
|---|---|---|---|---|---|---|---|---|---|
| Example 1-3 | gas generation after 70 hours | 90.0 | 6.5 | $Li_2SiO_3$ | present | present | no C—Si peak | substantially 0 | 50 |
| Example 2-1 | gas generation after 68 hours | 90.1 | 6.5 | $Li_2SiO_3$ | present | present | 0.95A ≥ B | substantially 0 | 50 |
| Example 2-2 | gas generation after 55 hours | 90.2 | 6.5 | $Li_2SiO_3$ | present | present | 1.02A ≥ B | substantially 0 | 50 |
| Example 2-3 | gas generation after 50 hours | 90.0 | 6.5 | $Li_2SiO_3$ | present | present | 1.1A ≥ B | substantially 0 | 50 |
| Example 2-4 | gas generation after 30 hours | 90.1 | 6.5 | $Li_2SiO_3$ | present | present | 1.2A ≥ B | substantially 0 | 50 |

As shown in Table 2, the higher the crystallinity of Si, the faster the gas generation. In consideration of lithium-ion secondary battery production process, it is more desirable to achieve the stability of 48 hours or longer as achieved by 1.1A≥B (Example 2-3). Thus, more favorable results were obtained when the peak of crystalline Si was smaller than that in Example 2-3.

Examples 3-1 to 3-7

Negative electrode active materials were produced as in Example 1-1, except for changing the particle diameters of the negative electrode active material particles. Further, each measurement was carried out as in Example 1-1. Table 3 shows the evaluation results of Examples 3-1 to 3-7.

TABLE 3

|  | Slurry stability | First time efficiency (%) | Particle diameter (μm) | $Li_2SiO_3$, $Li_2Si_2O_5$ confirmed by NMR | Si K-edge 1847 eV | 1851 to 1852 eV | Raman ≥B | $^{29}$Si-MAS-NMR | Carbon coating layer thickness (nm) |
|---|---|---|---|---|---|---|---|---|---|
| Example 3-1 | gas generation after 30 hours | 89.8 | 1 | $Li_2SiO_3$ | present | present | no C—Si peak | substantially 0 | 50 |

TABLE 3-continued

|  | Slurry stability | First time efficiency (%) | Particle diameter (μm) | Li$_2$SiO$_3$, Li$_2$Si$_2$O$_5$ confirmed by NMR | Si K-edge 1847 eV | 1851 to 1852 eV | Raman ≥B | $^{29}$Si-MAS-NMR | Carbon coating layer thickness (nm) |
|---|---|---|---|---|---|---|---|---|---|
| Example 3-2 | gas generation after 52 hours | 90.0 | 2 | Li$_2$SiO$_3$ | present | present | no C—Si peak | substantially 0 | 50 |
| Example 3-3 | gas generation after 61 hours | 90.1 | 4 | Li$_2$SiO$_3$ | present | present | no C—Si peak | substantially 0 | 50 |
| Example 1-3 | gas generation after 70 hours | 90.0 | 6.5 | Li$_2$SiO$_3$ | present | present | no C—Si peak | substantially 0 | 50 |
| Example 3-4 | gas generation after 70 hours | 90.2 | 8 | Li$_2$SiO$_3$ | present | present | no C—Si peak | substantially 0 | 50 |
| Example 3-5 | gas generation after 72 hours | 90.2 | 10 | Li$_2$SiO$_3$ | present | present | no C—Si peak | substantially 0 | 50 |
| Example 3-6 | gas generation after 75 hours | 90.3 | 12 | Li$_2$SiO$_3$ | present | present | no C—Si peak | substantially 0 | 50 |
| Example 3-7 | No gas generation after 75 hours, but some solid contents were separated and precipitated | 90.1 | 15 | Li$_2$SiO$_3$ | present | present | no C—Si peak | substantially 0 | 50 |

Table 3 shows that smaller particle diameters make gas generation more noticeable. This is presumably caused by increased reaction area. Meanwhile, increasing the particle diameters stably delayed gas generation. Nevertheless, there was such a trend that slight precipitation was observed when the particle diameters were about 15 μm. Thus, the negative electrode active material particles preferably have a median diameter of 2.0 μm or more and 12 μm or less.

Examples 4-1 to 4-4

Negative electrode active materials were produced as in Example 1-1, except for changing the thicknesses of the carbon coating layers. In Example 4-1, no carbon coating was performed. Further, each measurement was carried out as in Example 1-1. Table 4 shows the evaluation results of Examples 4-1 to 4-4.

TABLE 4

|  | Slurry stability | First time efficiency (%) | Particle diameter (μm) | Li$_2$SiO$_3$, Li$_2$Si$_2$O$_5$ confirmed by NMR | Si K-edge 1847 eV | 1851 to 1852 eV | Raman ≥B | $^{29}$Si-MAS-NMR | Carbon coating layer thickness (nm) |
|---|---|---|---|---|---|---|---|---|---|
| Example 1-3 | gas generation after 70 hours | 90.0 | 6.5 | Li$_2$SiO$_3$ | present | present | no C—Si peak | substantially 0 | 50 |
| Example 4-1 | gas generation after 32 hours | 89.5 | 6.5 | Li$_2$SiO$_3$ | present | present | no C—Si peak | substantially 0 | 0 |
| Example 4-2 | gas generation after 50 hours | 90.1 | 6.5 | Li$_2$SiO$_3$ | present | present | no C—Si peak | substantially 0 | 5 |
| Example 4-3 | gas generation after 75 hours | 90.0 | 6.5 | Li$_1$SiO$_3$ | present | present | no C—Si peak | substantially 0 | 500 |

TABLE 4-continued

| | Slurry stability | First time efficiency (%) | Particle diameter (μm) | $Li_2SiO_3$, $Li_2Si_2O_5$ confirmed by NMR | Si K-edge 1847 eV | 1851 to 1852 eV | Raman ≥B | $^{29}$Si-MAS-NMR | Carbon coating layer thickness (nm) |
|---|---|---|---|---|---|---|---|---|---|
| Example 4-4 | gas generation after 85 hours | 90.1 | 6.5 | $Li_2SiO_3$ | present | present | no C—Si peak | substantially 0 | 1000 |

The carbon layer not only gives electric conductivity, but also influences the slurry stability. Providing a carbon layer is preferable because it prevents direct contact with water, causing less gas generation. Meanwhile, although increasing the carbon layer thickness stably delayed gas generation, too large thickness may lower the capacity of the active material. Thus, the upper limit of the carbon coating layer thickness is preferably 500 nm.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. A method for producing a negative electrode active material containing negative electrode active material particles, the method comprising steps of:

preparing silicon compound particles each containing a silicon compound that contains oxygen;

inserting Li into the silicon compound particles to incorporate at least one of $Li_2SiO_3$ and $Li_2Si_2O_5$ into the silicon compound particles so as to prepare the negative electrode active material particles;

further selecting, from the prepared negative electrode active material particles, such negative electrode active material particles each having a peak P derived from the Li silicate and located near 1847 eV and a peak Q gentler than the peak P and located near 1851 to 1852 eV in a Si K-edge spectrum obtained from XANES spectra when the prepared negative electrode active material particles are subjected to XANES measurement; and using the selected negative electrode active material particles to produce a negative electrode active material.

* * * * *